(12) United States Patent
Ishida et al.

(10) Patent No.: US 6,642,689 B2
(45) Date of Patent: Nov. 4, 2003

(54) CONTROL APPARATUS FOR POWER CONVERTER

(75) Inventors: Seiji Ishida, Hitachi (JP); Toshiaki Okuyama, Tokai (JP); Takashi Ogawa, Mito (JP); Tetsuo Kojima, Hitachinaka (JP); Kiyoshi Nakata, Iwase (JP)

(73) Assignee: Hitachi, Ltd., Tokyo (JP)

( * ) Notice: Subject to any disclaimer, the term of this patent is extended or adjusted under 35 U.S.C. 154(b) by 90 days.

(21) Appl. No.: 09/956,088

(22) Filed: Sep. 20, 2001

(65) Prior Publication Data

US 2002/0141212 A1 Oct. 3, 2002

(30) Foreign Application Priority Data

Feb. 13, 2001 (JP) ........................ 2001-034782

(51) Int. Cl.[7] ................................ H02P 7/63
(52) U.S. Cl. ........................ 318/807; 318/812
(58) Field of Search ........................ 318/801, 807, 318/808, 812

(56) References Cited

U.S. PATENT DOCUMENTS

| | | | | |
|---|---|---|---|---|
| 4,788,485 A | * | 11/1988 | Kawagishi et al. | ......... 318/811 |
| 5,231,339 A | * | 7/1993 | Kishimoto et al. | ......... 318/807 |
| 5,373,223 A | * | 12/1994 | Akagi et al. | ................. 318/722 |
| 6,166,514 A | * | 12/2000 | Ando et al. | .................. 318/811 |
| 6,166,929 A | * | 12/2000 | Ma et al. | ....................... 363/37 |

FOREIGN PATENT DOCUMENTS

| | | |
|---|---|---|
| JP | 57-145503 | 9/1982 |
| JP | 5-083976 | 4/1993 |
| JP | 2000-312403 | 11/2000 |

* cited by examiner

*Primary Examiner*—Bentsu Ro
(74) *Attorney, Agent, or Firm*—Crowell & Moring LLP

(57) ABSTRACT

Filter capacitor voltage "Ecf1" is detected and then after d-axis voltage correction value "dvd", q-axis voltage correction value "dvq", q-axis current correction value "diq", and frequency correction value "dω1" have been computed from the AC components of "Ecf1" and the results have been added to the corresponding d-axis voltage command, q-axis voltage command, q-axis current, and frequency command, the DC current of the power converter is controlled. Thus, the AC components included in the DC current are offset and the AC components are suppressed effectively.

20 Claims, 10 Drawing Sheets

CONTROL APPARATUS FOR POWER CONVERTER

BACKGROUND OF THE INVENTION

1. Field of the Invention

The present invention relates to power converter control apparatus intended for converting direct-current power into alternating-current power and driving an induction motor.

2. Description of Prior Art

Figure 2:
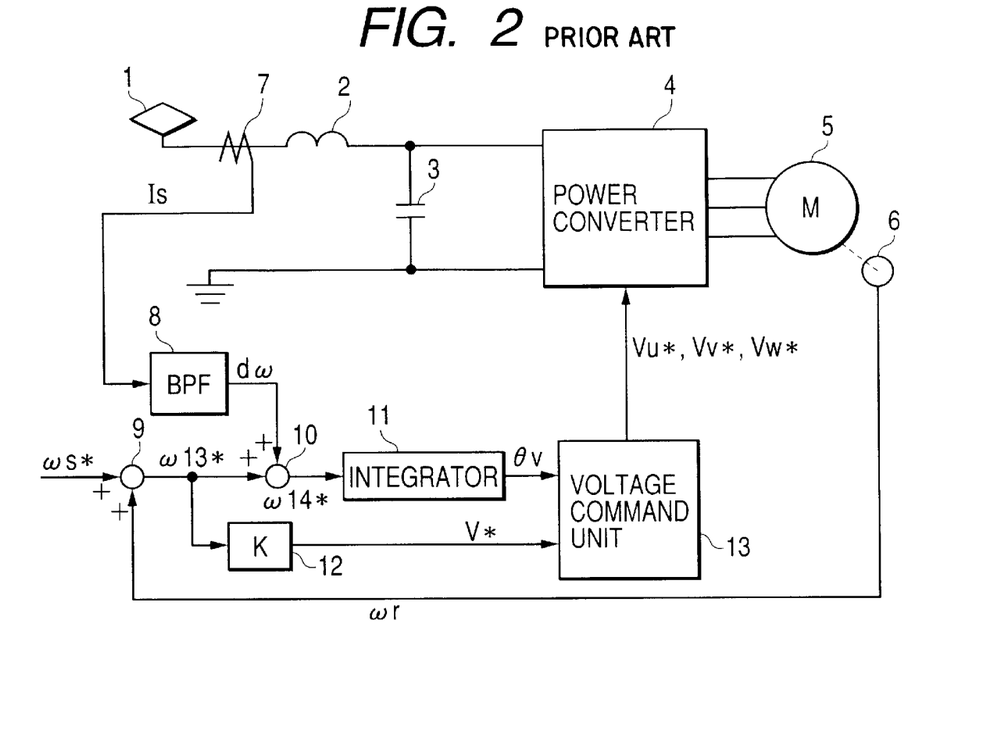
FIG. 2 is a block diagram of an induction machine control method employed in prior art.

In the railroad rolling stock field, the induction machines controlled by the power converters for converting direct-current (hereinafter referred to as DC) trolley wire voltages into variable-frequency variable alternating-current (likewise, referred to as AC) voltages are used to drive electric rolling stock. An induction machine control method using prior art is shown in FIG. 2. In FIG. 2, numeral 1 denotes a current collector; numeral 2, a filter reactor; numeral 3, a filter capacitor; numeral 4, a power converter; numeral 5, an induction motor; numeral 6, a rotational speed detector; numeral 7, a current detector; numeral 8, a bandpass filter; numerals 9 and 10, adders; numeral 11, an integrator; numeral 12, a coefficient multiplier; and numeral 13, a voltage command unit.

The DC voltage from the trolley wire is received at current collector 1, then the high-frequency components of the received voltage are removed via filter reactor 2 and filter capacitor 3, and the DC voltage is supplied to power converter 4. Power converter 4 converts the DC voltage into a variable-frequency variable AC voltage in accordance with AC voltage commands Vu*, Vv*, and Vw*, and controls induction machine 5. The slip frequency command ωs* externally set to the rotational speed ωr which has been detected by rotational speed detector 6 provided to detect the rotational speed of induction machine 5 is added by adder 9, and thus a first frequency command value ω13* is calculated. After being detected by current detector 7, the trolley wire current Is flowing through filter reactor 2 is sent to bandpass filter 8, and components in the neighborhood of the resonance frequency determined by the capacities of filter reactor 2 and filter capacitor 3 are detected. The frequency correction value dω that has been sent from bandpass filter 8, and the first frequency command value ω13* mentioned above are added by adder 10, and then a second frequency command value ω14* is calculated. The second frequency command value ω14* is integrated by integrator 11 and thus the voltage phase θv is obtained. Also, coefficient multiplier 12 multiplies the first frequency command value ω13* by a predetermined frequency voltage ratio K, and thus a voltage command value V* is calculated. Voltage command unit 13 issues AC voltage commands Vu*, Vv*, and Vw* in accordance with the above-mentioned voltage phase θv.

The control method described above is disclosed in Japanese Laid-open Patent Application No. Sho 57-145503 (JP A 57-145503). A method of controlling AC voltages, based on trolley wire currents, is also disclosed in Japanese Laid-open Patent Application No. Sho 57-145503 (JP A 57-145503). According to the above prior art, the instability and vibration that are caused by the resonance of the filter reactor and the filter capacitor can be suppressed.

Also, methods of controlling electric rolling stock by use of an induction machine are disclosed in Japanese Laid-open Patent Application No. Hei 05-83976 and 2000-312403 (JP A 05-83976 and JP A 2000-312403).

SUMMARY OF THE INVENTION

PROBLEMS TO BE SOLVED BY THE INVENTION

In railroad rolling stock, the return wire current of the DC voltage which has been supplied from the trolley wire to the power converter is induced into the track along which electric rolling stock travels. The track with safety devices installed on the ground is also used as a track circuit for detecting the electric rolling stock on the line. Accordingly, faults may occur in the track circuit if the return wire current of the power converter includes a fault current of the same frequency components as those of the AC signal used for the track circuit. In this case, therefore, the fault current within the return wire current needs to be removed. The return wire current flowing into the track and the trolley wire current flowing into the filter reactor are of the same value. For this reason, in the description given below, both currents are unified into a trolley wire current, except when their distinction is necessary.

Although the fault current included in the trolley wire current can be removed using the filter reactor and filter capacitor mounted in the railroad rolling stock, the inductance of the filter reactor and the capacity of the filter capacitor need to be increased in order to achieve applicability to a track circuit which, as with a divided-and-doubled frequency track circuit, uses a low frequency. If the above factors are increased, however, this will also increase the weight of the railroad rolling stock, thus resulting in problems such as deteriorated acceleration/deceleration performance and increased power consumption.

Figure 3A:
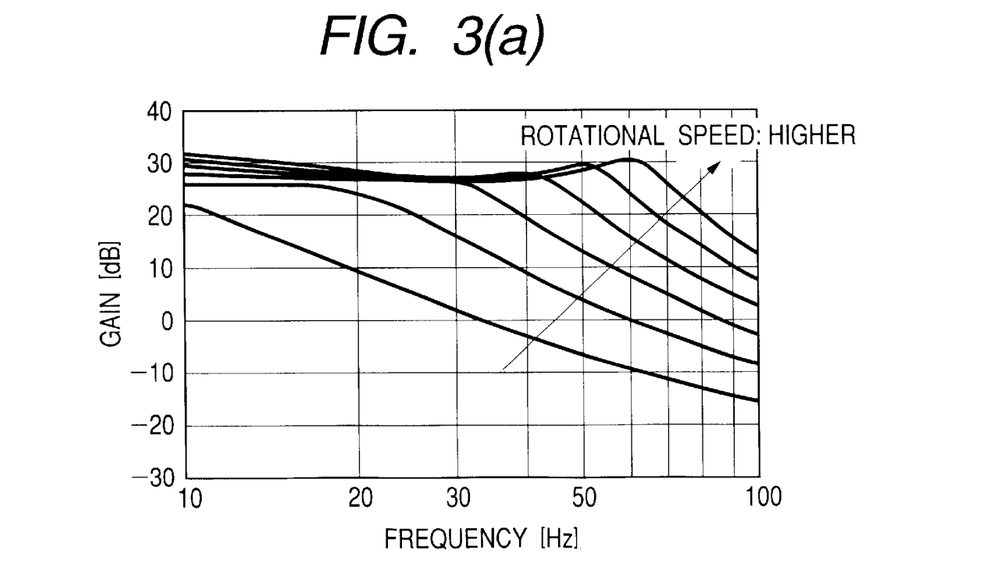
Figure 3B:
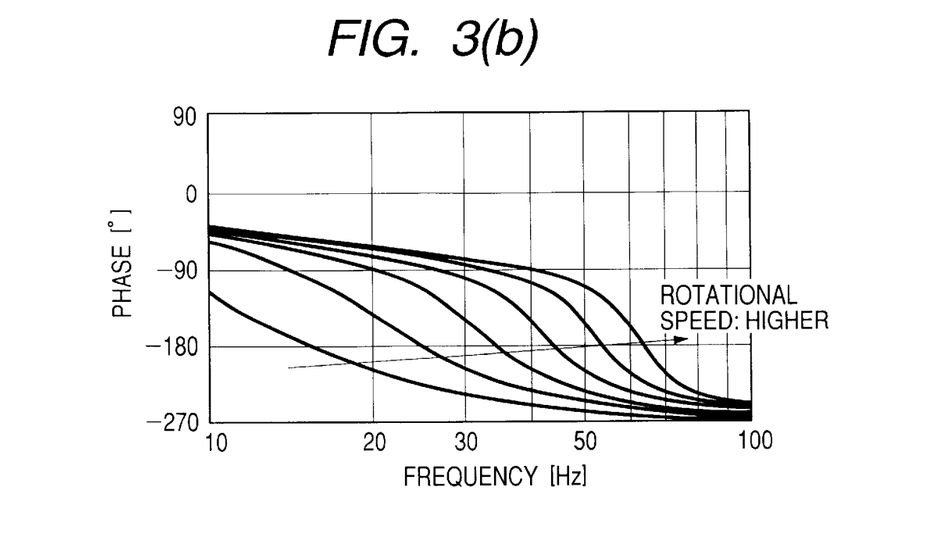

Under prior art, controlling the current at the DC side of the power converter is accomplished by adjusting the frequency according to the particular trolley wire current and controlling the electric power of the induction machine, and thus the fault current is eliminated. However, when the frequency is adjusted and the electric power of the induction machine is controlled, the electrical delay factors of the induction machine will cause a significant time lag in electric power with respect to the amount of frequency adjustment (hereinafter, referred to as the manipulated variable). FIGS. 3(a) and (b) show the frequency characteristics that cover the range from the manipulated variable to the electric power of the induction machine, and six frequency response curves are shown that were obtained when the rotational speed of induction machine 5 was changed. The horizontal axis in FIG. 3(a) denotes the frequency of the AC components included in the manipulated variable, and the vertical axis denotes the amplitude ratio between the frequency components shown in the horizontal axis and the corresponding AC components of the electric power of the induction machine. The horizontal axis in FIG. 3(b) denotes the same as in FIG. 3(a), and the horizontal axis denotes the differences in phase between the corresponding AC components and the electric power of the induction machine. It can be seen from FIGS. 3(a) and (b) that in the 25–60 Hz band commonly used for track circuits, the phase of the electric power of the induction machine significantly delays behind the manipulated variable. If such feedback loop as shown in FIG. 2 is formed in the case that there is a significant phase delay in the range from the manipulated variable to the controlled variable, operation will tend to become unstable, and if the gain of the feedback loop is increased for suppressed fault current, the control system will become unstable and the fault current included in the trolley wire current will not be effectively controllable.

Even with a control method in which the AC voltage is controlled in accordance with the trolley wire current value, the fault current cannot be effectively suppressed since the electric power of the induction machine is significant in phase delay behind the manipulated variable.

An object of the present invention is to suppress effectively the fault current included in the trolley wire current, without increasing the capacities of the filter reactor or the filter capacitor.

MEANS FOR SOLVING THE PROBLEMS

The above object can be realized by using power converter control apparatus that can issue an AC voltage command, subject to a voltage command and a frequency command, to a power converter for converting a DC voltage into a variable AC voltage of a variable frequency, have a detector for detecting the DC voltage of the power converter, namely, the amount of electricity generated at the direct-current side of the power converter, or for detecting the voltage developed across a filter reactor, or for detecting the current flowing through the filter reactor, a high-pass filter for removing direct-current components from the detected amount of electricity, a voltage corrector for correcting said voltage command in accordance with an output signal from said high-pass filter, and a frequency corrector for correcting said frequency command in accordance with an output signal from said high-pass filter, and send an AC voltage command in accordance with output signals from said frequency corrector and said voltage corrector.

Since internal interference of an induction machine connected to the AC side of the power converter can be suppressed by simultaneously controlling frequency and voltage in the way described above, the electric power of the induction machine can be controlled with an insignificant phase delay and the fault current can be suppressed effectively.

Also, even if the voltage at the AC side of the power converter saturates, stable control can be implemented by stopping the voltage command operations and changing the control mode to the control of the frequency command only.

BRIEF DESCRIPTION OF THE DRAWINGS

FIG. 3($a$) is a graph showing the ratio between the frequency of the AC components of a manipulated variable in prior art, and the amplitude of the AC components within the electric power of an induction machine against the frequency components of the AC components of the manipulated variable;

FIG. 3($b$) is a graph showing the differences between the frequency of the AC components of a manipulated variable in prior art, and the phase of the AC components within the electric power of an induction machine against the phase of the AC components of the manipulated variable;

FIG. 5($a$) is a graph showing the gain-versus-frequency characteristics of the change "Δiq1" in q-axis current against the q-axis current correction command "iq*" used in the first embodiment;

FIG. 5($b$) is a graph showing the phase-versus-frequency characteristics of the change "Δiq1" in q-axis current against the q-axis current correction command "iq*" used in the first embodiment;

DETAILED DESCRIPTION OF EMBODIMENTS OF THE INVENTION

Embodiments of the present invention will be described hereunder, referring to the drawings.

Figure 1:
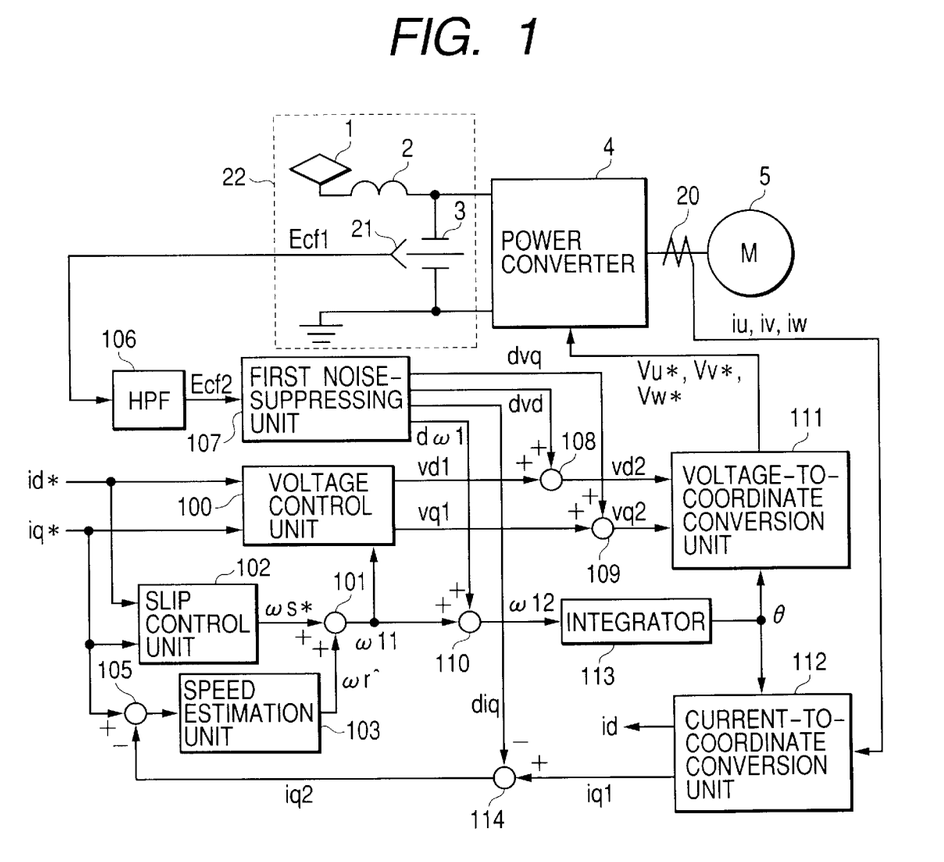
FIG. 1 is a block diagram of a first embodiment.

A first embodiment of the present invention is shown in FIG. 1. This figure applies to the configuration of vector control that can suppress fault currents even without a speed sensor. The same components as those used under the prior art described earlier in this document, are shown using the same numerals. In FIG. 1, numeral 20 denotes a current detector; numeral 21, a voltage detector; numeral 22, a power-receiving circuit; numeral 100, a voltage control unit; numerals 101, 108, 109, and 110, adders; numeral 102, a slip control unit; numeral 103, a speed estimation unit; numerals 104 and 105, subtractors; numeral 106, a high-pass filter; numeral 107, a first noise-suppressing unit; numeral 111, a voltage-to-coordinate conversion unit; numeral 112, a current-to-coordinate conversion unit; and numeral 113, an integrator.

Power-receiving circuit 22 includes a current collector 1, a filter reactor 2, a filter capacitor 3, and voltage detector 21, and in addition to supplying a DC voltage to a power converter 4, sends a first filter capacitor voltage Ecf1. Voltage control unit 100, after receiving as its input signals a d-axis current command "id*" and a q-axis current command "iq*" from an external circuit and receiving a first frequency command ω11 from adder 101, computes a first d-axis voltage command value "vd1" in accordance with expression (1) below and further computes a first q-axis voltage command value "vq1" in accordance with expression (2) below.

Numeric expression 1

$$vd1 = R\sigma \cdot id^* - \omega 11 \cdot 1\sigma \cdot iq^* \quad (1)$$

Numeric expression 2

$$vq1 = \omega 11 \cdot L1 \cdot id^* + R\sigma \cdot iq^* \quad (2)$$

In the above expressions, Rσ, lθ, and L1 denote the motor constants of induction machine 5. More specifically, Rσ, lθ, and L1 denote the equivalent of a primary coil resistance value, the equivalent of a primary leakage inductance, and a primary self-inductance, respectively.

Slip control unit 102 receives d-axis current command "id*" and q-axis current command "iq*" as its input signals, and computes slip frequency command value ωs* in accordance with expression (3) below.

Numeric expression 3

$$\omega s^* = \frac{R2 \cdot iq^*}{L2 \cdot id^*} \quad (3)$$

In the above expression, R2 and L2 denote the motor constants of induction machine 5. More specifically, R2 and L2 denote a secondary resistance value and a secondary self-inductance, respectively.

Speed estimation unit 103 computes rotational speed estimation value ωr^ by estimating the rotational speed of induction machine 5 in accordance with expression (4) below by use of the output signal sent from subtractor 105 which calculates the difference between d-axis current command "id*" and the second q-axis current command "iq2" sent from subtractor 104.

Numeric expression 4

$$\omega r^\wedge = \left(Kp + \frac{Ki}{s}\right) \cdot (iq^* - i2q) \quad (4)$$

where Kp and Ki denote control gain values and "s" is a Laplace operator.

Adder 101 adds slip frequency command value ωs* and rotational speed estimation value ωr^ and computes the first frequency command ω11.

High-pass filter 106 removes the low-frequency components that include the DC components of the first filter capacitor voltage Ecf1, which is the voltage that has been developed across filter capacitor 3 and detected by voltage detector 21, and sends a second filter capacitor voltage Ecf2.

First noise-suppressing unit 107 computes d-axis voltage correction value "dvd", q-axis voltage correction value "dvq", frequency correction value "ω1", and q-axis current correction value "dvi", in accordance with the second filter capacitor voltage Ecf2 value. Details of the first noise-suppressing unit 107 are described later in this document.

Adder 108 adds d-axis voltage correction value "dvd" and a first d-axis voltage command value "vd1" and calculates a second d-axis voltage command value "vd2". Adder 109 adds q-axis voltage correction value "dvq" and a first q-axis voltage command value "vq1" and calculates a second q-axis voltage command value "vq2". Voltage-to-coordinate conversion unit 111 converts second d-axis voltage command value "vd2" and second q-axis voltage command value "vq2" into rotational coordinates in accordance with phase θ which is an output signal from integrator 113, and computes AC voltage command values Vu*, Vv*, and Vw*.

Adder 110 derives a second frequency command ω12 by adding frequency correction value dω1 and first frequency command ω11, and derives phase θ by integrating second frequency command ω12 in integrator 113. Current-to-coordinate conversion unit 112 calculates d-axis current value "id" and first q-axis current value "iq1" by converting, into rotational coordinates in accordance with phase θ, the motor current values "iu", "iv", and "iw" that have been detected by the current detector 20 provided for detecting the currents flowing from power converter 4 into induction machine 5. Subtractor 104 subtracts q-axis current correction value "diq" from the first q-axis current value "iq1" and sends a second q-axis current value "iq2" as the output signal.

Figure 4:
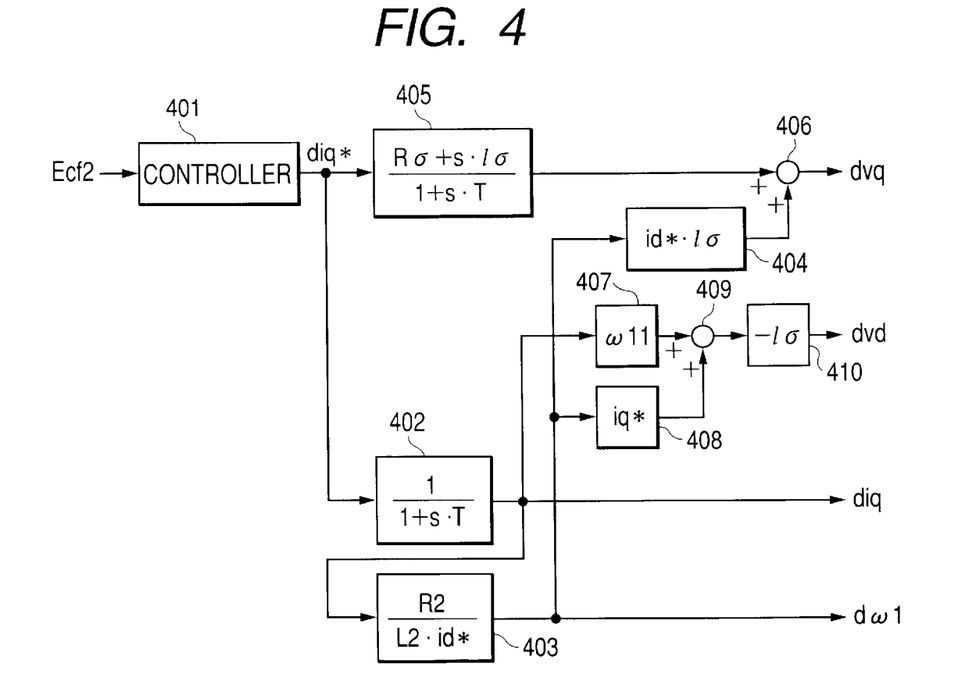
FIG. 4 is a block diagram of a first noise-suppressing unit in the first embodiment.

The configuration of the first noise-suppressing unit 107 are shown in detail in FIG. 4. In this figure, numeral 401 denotes a controller; numeral 402, a first-order lag element; numerals 403, 404, 407, 408, and 410, coefficient multipliers; numeral 405, an advance/lag element; and numerals 406 and 409, adders.

Controller 401 receives second filter capacitor voltage Ecf2 as its input signal, and sends q-axis current correction command "diq" as its output signal. Controller 401 uses the transfer function shown in, for example, expression (5) below.

Numeric expression 5

$$\frac{K1 \cdot s}{(1 + T1 \cdot s) \cdot (1 + T2 \cdot s)} \quad (5)$$

where K1 is a control gain and T1 and T2 are control time constants.

The d-axis correction value "dvd", the q-axis correction value "dvq", the frequency correction value "dω1", and the q-axis current correction value "diq" are derived from the q-axis current correction command value "diq*". The q-axis current correction value "diq" is the output from the first-order lag element 402 with the q-axis current correction command value "diq*" as its input. Frequency correction value "dω1" is the output from the coefficient multiplier 403 which multiplies the gain data shown in expression (6) below.

Numeric expression 6

$$\frac{R2}{L2 \cdot id^*} \quad (6)$$

The d-axis voltage correction value "dvd" is derived by first adding the output of the coefficient multiplier 407 existing after it has multiplied the q-axis current correction value "diq" by the first frequency command value "ω11", and the output of the coefficient multiplier 408 existing after it has multiplied the frequency correction value "dω1" by the q-axis current command value "iq*", and further multiplying the sum total by "−1σ" by use of coefficient multiplier 404. The q-axis voltage correction value "dvq" is derived by first multiplying the output of the advance/lag element 405 existing after it has received the q-axis current correction command "di*" as its input signal, by the product obtained by multiplying the frequency correction value "dω1" by the d-axis current command value "id*" and the leakage inductance value "1σ" by use of coefficient multiplier 404, and then adding the results.

Next, the principles of operation of this embodiment are described below. The induction of a fault current into the trolley wire current can be suppressed by removing the fault-causing AC components from the DC current flowing from the DC side into power converter 4. At this time, the AC components of the corresponding frequency of the filter capacitor voltage are cleared to zero. The above suppression can therefore be accomplished by controlling the DC current of power converter 4 so that the AC components of the corresponding frequency of the filter capacitor voltage are cleared to zero.

If it is assumed that the electrical loss in power converter 4 is small enough, electric power is equal between the AC side and DC side of power converter 4. It follows from this relationship that the DC current "Idc" of power converter 4 can be represented using expression (7) below.

Numeric expression 7

$$diq = \frac{1}{1+T \cdot s} \cdot diq^* \quad (7)$$

where "vd" and "vq" denote the d-axis voltage and q-axis voltage that are the output voltages developed at the AC side of power converter 4 on the rotational coordinates of the induction machine at a rotational speed of ω1; and "Id" and "Iq1" denote the d-axis current and q-axis current that are the output currents developed at the AC side of power converter 4 on the rotational coordinates of the induction machine at a rotational speed of ω1, and are also the output signals of current-to-coordinate conversion unit 112; and "Ecf" denotes the voltage developed across filter capacitor 3 as the DC voltage of power converter 4.

The presence of a fault current becomes a problem when the rotational speed or of induction machine 5 increases with the DC current. At this time, compared with d-axis voltage Vd, q-axis voltage vq increases. Expression (7) can therefore be approximated into expression (8) below.

Numeric expression 8

$$idc = \frac{1}{Ecf} \cdot vq \cdot i1q \quad (8)$$

It can be seen from expression (8) above that if the first q-axis current "iq1" can be controlled, DC current "idc" can be controlled. Next, a method of controlling the first q-axis current "iq1" is described below.

The formula for calculating the voltage of induction machine 5 in the rotational coordinate system of the d-axis and q-axis at a rotational angular speed of ω1 is shown as expression (9) below.

Numeric expression 9

$$\begin{pmatrix} vd \\ vq \\ 0 \\ 0 \end{pmatrix} = \begin{pmatrix} R\sigma + s \cdot l\sigma & -\omega l \cdot l\sigma & -\frac{M}{L2^2} \cdot R2 & -\omega r \cdot \frac{M}{L2} \\ \omega l \cdot l\sigma & R\sigma + s \cdot l\sigma & \omega r \cdot \frac{M}{L2} & -\frac{M}{L2^2} \cdot R2 \\ -R2 \cdot \frac{M}{L2} & 0 & \frac{R2}{L2} + s & -\omega s \\ 0 & -R2 \cdot \frac{M}{L2} & \omega s & \frac{R2}{L2} + s \end{pmatrix} \cdot \begin{pmatrix} id \\ i1q \\ \phi d \\ \phi q \end{pmatrix} \quad (9)$$

where ωs denotes the difference between ω1 and ωr, namely, the slip frequency; M denotes the mutual inductance of induction machine 5; φd denotes the d-axis magnetic flux intensity of induction machine 5; and φq denotes the q-axis magnetic flux intensity of induction machine 5.

It can be seen from expression (9) above that there are correlations between the d-axis and the q-axis and between current and magnetic flux intensity. For this reason, if frequency ω1 only is adjusted, since not only the first q-axis current "iq1" will be controlled but also the d-axis current "id", the d-axis magnetic flux intensity "φd", and the q-axis magnetic flux intensity "φq" will change and interference will result, highly responsive control will be difficult to implement. The same also applies if voltage only is controlled.

Accordingly, it is necessary to use a control method in which neither the d-axis current "id", the d-axis magnetic flux intensity "φd", nor the q-axis magnetic flux intensity "φq" will change when the first q-axis current "iq1" is controlled. For this reason, changes in d-axis current "id" and q-axis magnetic flux intensity "φq", associated with the control of the first q-axis current "iq1", are suppressed by controlling the q-axis magnetic flux intensity "φq" by means of frequency "ω1" and controlling the d-axis current "id" by means of d-axis voltage "vd". Since the third line in expression (9) does not include the first q-axis current "iq1" and includes only d-axis current "id" and q-axis magnetic flux intensity "φq", changes in q-axis magnetic flux intensity "φq" can be suppressed by suppressing those of d-axis current "id" and q-axis magnetic flux intensity "φq".

First, q-axis voltage correction value "dvq" is described below. If the first q-axis current "iq1" changes by "Δiq1", it can be seen from the second line of expression (9) that q-axis voltage correction value "dvq" needs to be controlled using expression (10) below.

Numeric expression 10

$$dvq = l\sigma \cdot id \cdot d\omega 1 + (R\sigma + s \cdot l\sigma) \cdot \Delta iq \quad (10)$$

Since changes in d-axis current "id", d-axis magnetic flux intensity "φd", and q-axis magnetic flux intensity "φq" are suppressed, these factors do not appear in expression (10) above. Frequency correction value "dω1", however, requires consideration, since it is adjusted as described later in this document. Also, "Δiq1" is very small and can therefore be approximated into linear form. However, since a differential term is included in expression (10), the above approximation cannot be implemented by using this expression as it is. A time lag with respect to q-axis current correction command value "diq*", therefore, needs to be inserted into "Δiq1" as shown in expression (11) below.

Numeric expression 11

$$\Delta iq1 = \frac{1}{1+T \cdot s} \cdot diq^* \quad (11)$$

Assigning expression (10) to expression (11) creates expression (12) below. The use of expression (12) below enables adjustment of q-axis voltage correction value "dvq".

Numeric expression 12

$$dvq = l\sigma \cdot id^* \cdot d\omega 1 + \frac{R\sigma + s \cdot l\sigma}{1+s \cdot T} \cdot diq^* \quad (12)$$

where d-axis current command value "id*" and d-axis current value "id" almost agree since voltage is controlled in accordance with expressions (1) and (2).

Next, frequency correction value "dω1" is described. Solving the fourth line of expression (9) with respect to q-axis magnetic flux intensity "φq" creates expression (13) below.

Numeric expression 13

$$\phi q = \frac{1}{\frac{R2}{L2}+s} \cdot \left( \frac{R2 \cdot M}{L2} \cdot iq - \omega s \cdot \phi d \right) \quad (13)$$

Since mechanical factors are involved in rotational speed "ω", changes in this speed can be ignored because of long time constants. Slip frequency "ωs" can therefore be directly adjusted according to the particular frequency correction value "dω1". Accordingly, since the parenthesized section in expression (13) can be cleared to zero by controlling the frequency correction value "dω1" by use of expression (14) below.

Numeric expression 14

$$d\omega 1 = \frac{R2}{L2 \cdot id^*} \cdot \frac{1}{1+s \cdot T} \cdot diq^* \quad (14)$$

Since voltage is controlled in accordance with expressions (1) and (2), "φd" is equal to the product of (M×id*).

Next, d-axis voltage correction value "dvd" is described. In consideration of the facts that changes in d-axis magnetic flux intensity "φd" and q-axis magnetic flux intensity "φq" are suppressed, that the first q-axis current "iq1" is controlled to "Δiq1", that frequency "ω1" is adjusted with "dω1", and that changes in rotational speed "ωr" can be ignored, it can be seen from the first line of expression (9) that the relationship between the change "Δid" in d-axis current and the manipulated value "dvd" of the d-axis voltage can be represented by expression (15) below.

Numeric expression 15

$$(Ro+s \cdot 1\sigma) \cdot \Delta id = dvd + d\omega 1 \cdot 1\sigma \cdot iq1 + \omega 1 \cdot 1\sigma \cdot \Delta iq1 \quad (15)$$

Changes in d-axis current "id" can be suppressed by assigning 0 to the right side of expression (15). It can be seen from expression (11), therefore, that the manipulated value "dvd" of the d-axis voltage can be controlled using expression (16) below.

Numeric expression 16

$$dvd = -l\sigma \cdot \left( iq^* \cdot d\omega 1 + \frac{\omega 1}{1+T \cdot s} \cdot diq^* \right) \quad (16)$$

The q-axis current command value "iq*" and the second q-axis current value "iq2" are matched by the operation of speed estimation unit 103, and since the q-axis current correction value "diq" is very small, the q-axis current command value "iq*" and the first q-axis current value "iq1" is almost equal.

Next, q-axis current correction value "diq" is described below. When the first q-axis current is changed by "Δiq1", the speed estimation value "ωr" sent from speed estimation unit 103 will change according to the change of "Δiq1", with the result that the first d-axis voltage command value "vd1", the first q-axis voltage command value "vq1", and the first frequency command value "ω11" will change to cause interference. To prevent this, the second q-axis current value needs to be the value obtained by removing the change of "Δiq1" from the first q-axis current value. This means that q-axis current correction value "diq" needs to be the same value as "Δiq1", and thus it can be seen from expression (11) that expression (17) below can be applied.

Numeric expression 17

$$diq = \frac{1}{1+T \cdot s} \cdot diq^* \quad (17)$$

Figure 5A:
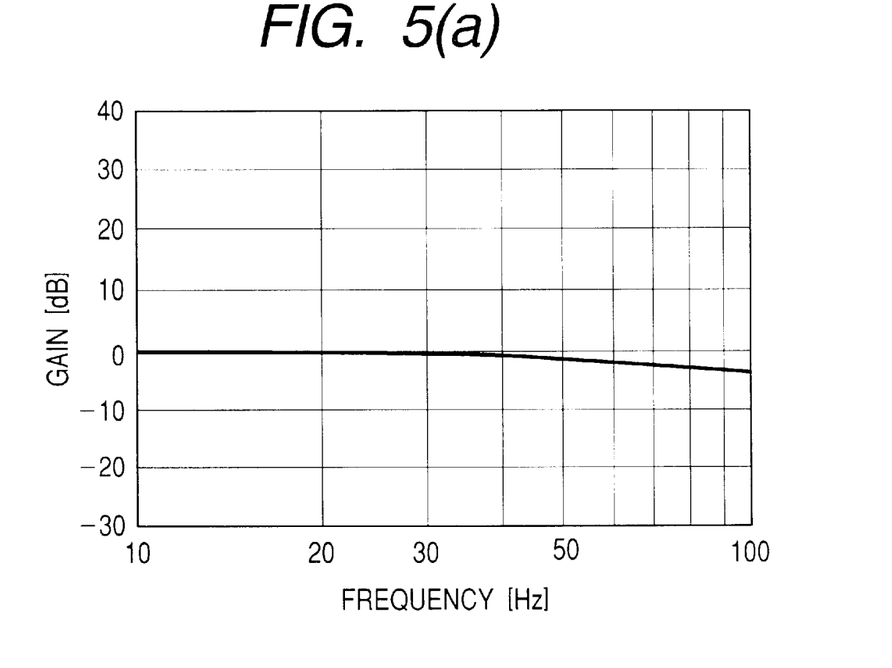
Figure 5B:
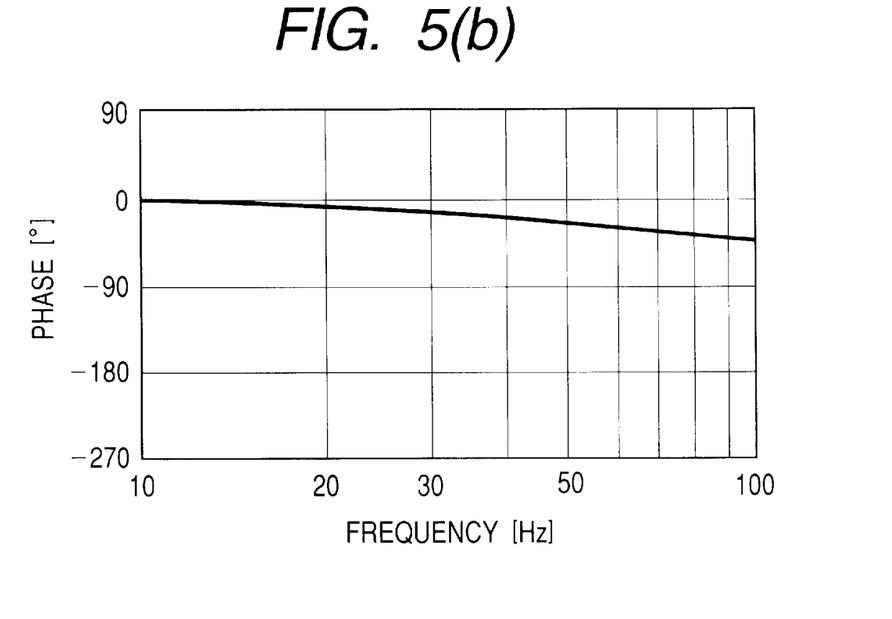

It can be seen from the above statement that an actual change in q-axis current with respect to q-axis current correction command "diq*" can be controlled to "Δiq1" by adjusting d-axis voltage correction value "dvd", q-axis voltage correction value "dvq", q-axis current correction value "diq", and frequency correction value "dω1", subject to q-axis current correction command "diq*" and in accordance with expressions (16), (12), (14), and (17). According to the block diagram shown in FIG. 4, d-axis voltage correction value "dvd", q-axis voltage correction value "dvq", q-axis current correction value "diq", and frequency correction value "dω1" can be adjusted, subject to q-axis current correction command "diq*" and in accordance with expressions (16), (12), (14), and (17). Since the relationship between q-axis current correction command "diq*" and "Δiq1" is represented as in expression (17), this relationship can be represented as first-order lag characteristics, and the frequency characteristics of gain and phase can be represented as in FIGS. 5(a) and (b), respectively. Compared with the frequency characteristics shown in FIGS. 3(a) and (b), those of FIGS. 5(a) and (b) indicate a small delay in phase and the absence of dependence on rotational speed. The first q-axis current can therefore be controlled with high response, and thus, it can be seen from expression (8) that the DC current can also be controlled with high response and that effective noise suppression is possible.

In addition, when the control gains Kp and Ki of speed estimation unit 103 in FIG. 1 are small and the estimated rotational speed response is slow, the high-frequency components included in the second q-axis current "iq2" do not appear in the first d-axis voltage command "vd1", the first q-axis voltage command "vq1", or the first frequency command "ω11". For this reason, when the estimated rotational speed response is slow in comparison to the frequency of the fault current to be suppressed, a similar effect can be obtained by omitting q-axis current correction value "diq" or clearing this to zero.

Furthermore, when leakage inductance "1σ" is small, since d-axis voltage correction value "dvd" decreases, a similar effect can be obtained by omitting d-axis voltage correction value "dvd" or clearing this to zero.

Figure 6:
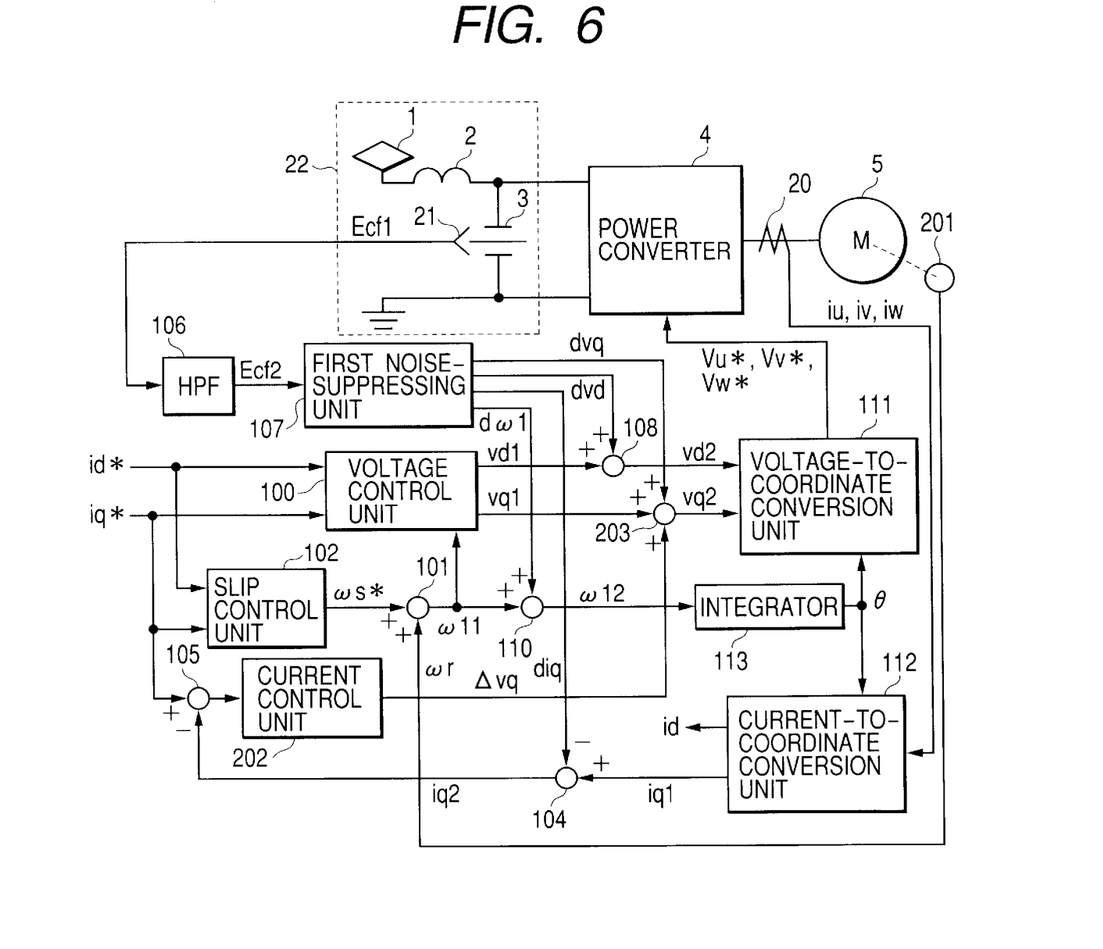
FIG. 6 is a block diagram of a second embodiment.

A second embodiment of the present invention is shown in FIG. 6. The same components as in FIG. 1 which shows the first embodiment, are shown using the same numerals. In FIG. 6, numeral 201 denotes a speed rotational detector; numeral 202, a current control unit; and numeral 203, an adder.

The difference between FIGS. 6 and 1 exists in that in FIG. 1, control uses the speed estimation value "ωr^" sent from speed estimation unit 103, whereas in FIG. 6, control uses the rotational speed "ωr" of induction machine 5 that has been detected by rotational speed detector 201. In FIG. 6, instead of the rotational speed "ωr^", the rotational speed value "ωr" that has been detected by rotational speed detector 201 is sent to adder 101. After this, the output of adder 105 is sent to current control unit 202, from which "Δvq" is then taken out as a second q-axis voltage correction value in accordance with expression (18) below.

Numeric expression 18

$$\Delta vq = \left( Kp2 + \frac{Ki2}{s} \right) \cdot (iq^* - i2q) \quad (18)$$

where Kp2 and Ki2 are control gains. The second q-axis voltage correction value "Δvq", the first q-axis voltage correction value "vq1", and the q-axis voltage correction value "dvq" are added by adder 203 to become a second q-axis voltage command value "vq2".

In the block diagram of FIG. 6 as well, since control uses the second q-axis current "iq2" obtained by removing the change "Δiq1" of the q-axis current from the first q-axis current according to the particular q-axis current correction value "diq", principles similar to those of the first embodiment apply and similar effects can be obtained.

In addition, when the control gains Kp2 and Ki2 of current control unit 202 are small and current control response is slow, the high-frequency components included in the second q-axis current "iq2" do not appear in the second q-axis voltage command "vq2". For this reason, when current control response is slow in comparison to the frequency of the fault current to be suppressed, a similar effect can be obtained by omitting q-axis current correction value "diq" or clearing this to zero.

Furthermore, when leakage inductance "1σ" is small, since d-axis voltage correction value "dvd" decreases, a similar effect can be obtained by omitting d-axis voltage correction value "dvd" or clearing this to zero.

Figure 7:
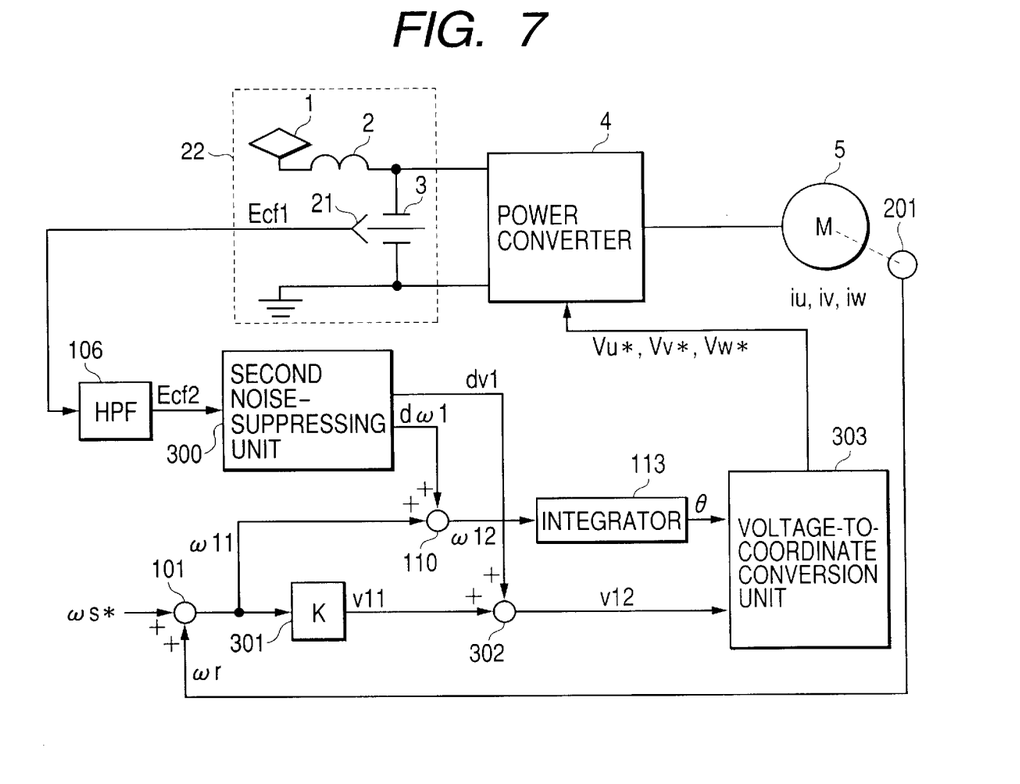
FIG. 7 is a block diagram of a third embodiment.

A third embodiment of the present invention is shown in FIG. 7. The same components as those shown in FIG. 6, are shown using the same numerals, and description of these components is omitted. In FIG. 7, numeral 300 denotes a second noise-suppressing unit; numeral 301, a coefficient multiplier; numeral 302, an adder; and numeral 303, a voltage-to-coordinate converter. FIG. 7 shows an example of application to slip frequency control. Slip frequency command "ωs*" is externally given and then added to rotational speed "ωr" by adder 101 to become a first frequency command "ω11". Coefficient multiplier 301 multiplies a first frequency command by frequency-voltage ratio K and computes first voltage command value "v11". Also, second filter capacitor voltage "Ecf2", the output of high-pass filter 106, is sent to second noise-suppressing unit 300, from which voltage correction value "dv1" and frequency correction value "dω1" are then taken out as output signals. Adder 110 adds frequency correction value "dω1" and first frequency command value "ω11" and computes second frequency command value "ω12".

Second frequency command value "ω12" is integrated by integrator 113 to become a phase value of θ. Also, voltage correction value "dv1" and first voltage command value "v11" are added by adder 302, and second voltage command value "v12", is computed. Voltage-to-coordinate converter 303 issues AC voltage commands Vu*. Vv*, and Vw*, subject to phase θ and second voltage command "v12".

Figure 8:
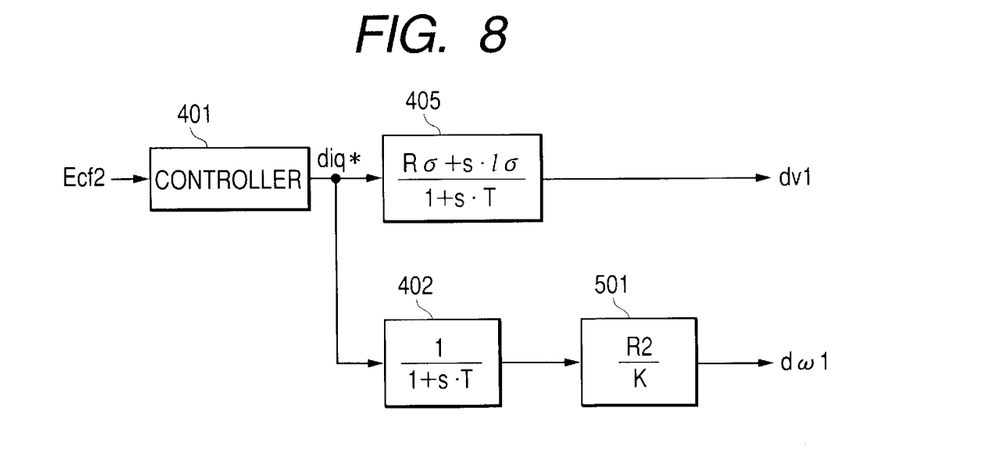
FIG. 8 is a block diagram of a second noise-suppressing unit in the third embodiment.

The configuration of second noise-suppressing unit 300 is shown in FIG. 8. The same components as the noise-suppressing unit components shown in FIG. 4, are assigned the same numbers, and description of these components is omitted. Numeral 501 in FIG. 8 denotes a coefficient multiplier. The output of advance/lag element 405 is taken out as voltage correction value "dv1". Also, the output of first-order lag element 402 is sent to coefficient multiplier 501, the output of which is then taken out as frequency correction value "dω1".

For slip frequency control, q-axis current correction value "diq" is not required because of a current controller being present, and when it is assumed that leakage inductance "1σ" is small, the d-axis voltage correction value is not required, either. In addition, since the q-axis voltage is higher than the d-axis voltage, the voltage command the q-axis voltage command almost agree, except that the rotational speed "ωr" of induction machine 5 is small. For this reason, no problems will arise, even if q-axis voltage correction value "dvq" is taken as voltage correction value "dv1". Expression (19) below applies because the first q-axis voltage command "vq1" and the first voltage command are almost equal.

Numeric expression 19

$$\omega 11 \cdot L1 \cdot id^* + R\sigma \cdot iq^* = K \cdot \omega 11 \quad (19)$$

Furthermore, since the second term on the left side of expression (19) is smaller than the first term of the left side, the second term on the left side can be ignored, and since secondary self-inductance L2 and the primary self-inductance are usually almost equal, expression (20) below holds.

Numeric expression 20

$$K = L2 \cdot id^* \quad (20)$$

Coefficient multiplier 501 can therefore be used, instead of the coefficient multiplier 403 in FIG. 4.

Hence, the third embodiment, as with the first embodiment and the second embodiment, enables the DC current to be controlled by adjusting the voltage, interference to be suppressed by adjusting the frequency, and similar effects to be obtained.

A fourth embodiment is shown in FIG. 8. The same components as those of the first embodiment shown in FIG. 1, are assigned the same numbers, and description of these components is omitted.

Figure 9:
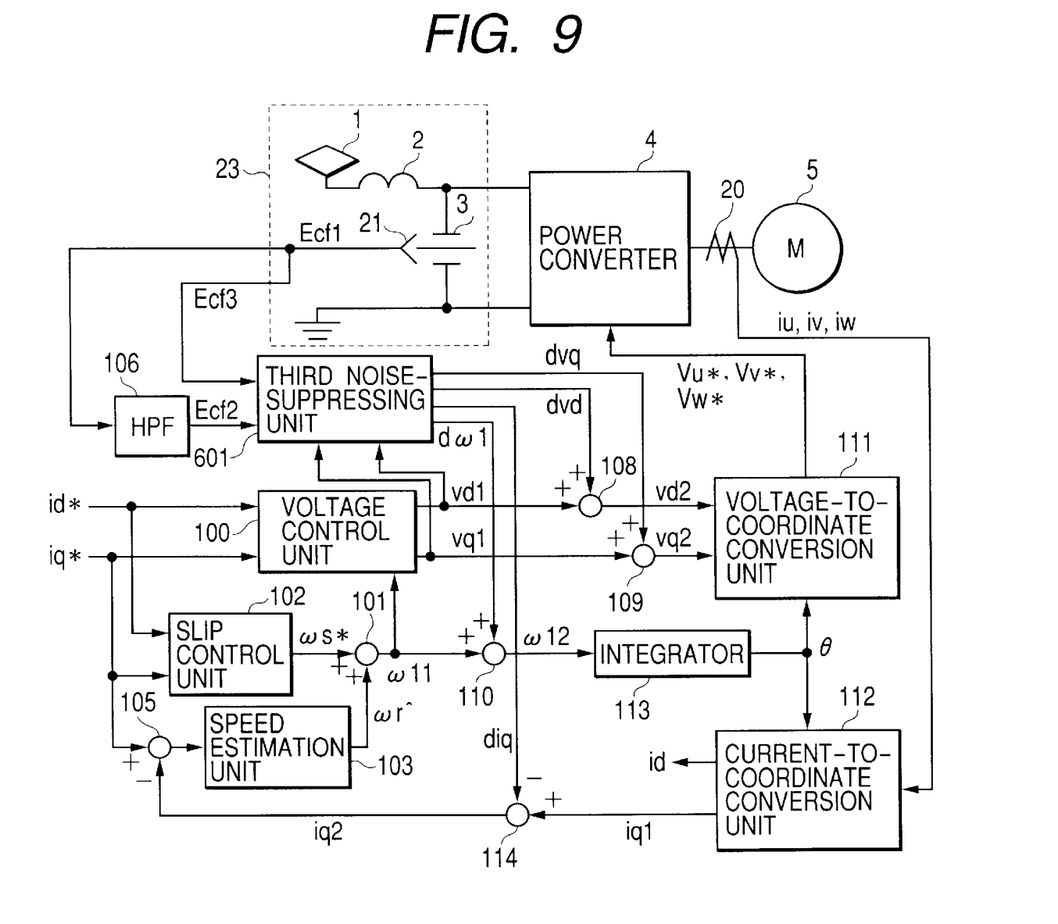
FIG. 9 is a block diagram of a fourth embodiment.

Numerals 23 and 601 in FIG. 9 denote a second power-receiving unit and a third noise-suppressing unit, respectively. Second power-receiving unit 23 differs from the power-receiving unit 22 of FIG. 1 in that in addition to first filter capacitor voltage "Ecf1", a third filter capacitor voltage "Ecf3" is sent from power-receiving unit 23 as the input of third noise-suppressing unit 601. Third noise-suppressing unit 601 receives third filter capacitor voltage "Ecf3", second filter capacitor voltage "Ecf2", first d-axis voltage command "vd1", and first q-axis voltage command "vq1", and sends d-axis voltage correction value "dvd", q-axis voltage correction value "dvq", q-axis current correction value "diq", and frequency correction value "dω1". Although third filter capacitor voltage "Evcf3" is the same as first filter capacitor voltage "Evcf1" in terms of value, since the first and third filter capacitors are connected to different portions, the corresponding capacitor voltages differ in notation in order to provide ease in the later description of another configuration of the second power-receiving unit.

Figure 10:
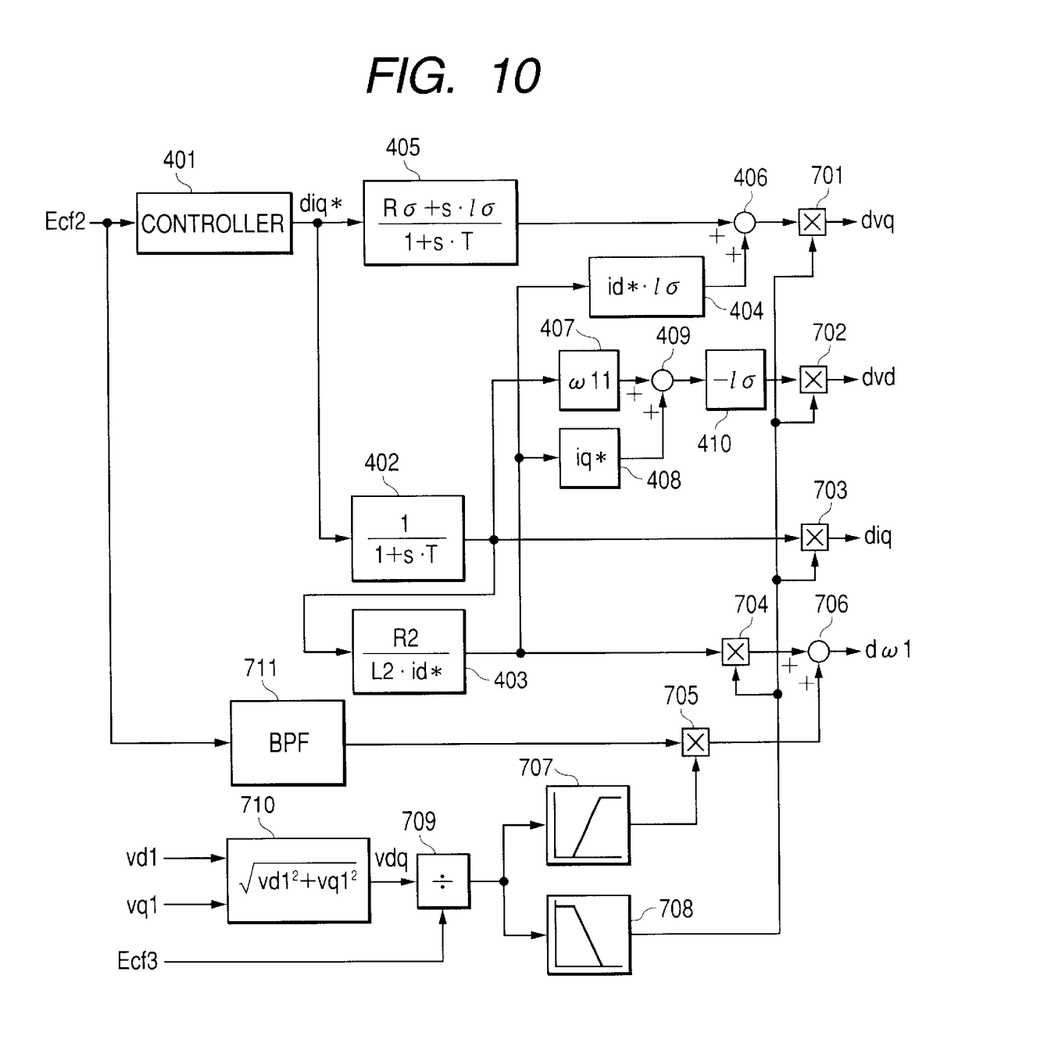
FIG. 10 is a block diagram of a third noise-suppressing unit in the fourth embodiment.

The configuration of third noise-suppressing unit 601 is shown in FIG. 10. The same components as those of the first noise-suppressing unit shown in FIG. 4, are assigned the same numbers, and description of these components is omitted. Numerals 701, 702, 703, 704, and 705 in FIG. 10 denote multipliers. Similarly, numeral 706 denotes an adder; numerals 707, 708, and 710, a function generator; numeral 709, a divider; and numeral 711, a bandpass filter.

Function generator 710 receives first d-axis voltage command "vd1" and first q-axis voltage command "vq1" as its input signals, then performs the operations shown in expression (21) below, and sends "vdq" as an output signal.

Numeric expression 21

$$vdq = \sqrt{vd1^2 + vq1^2} \quad (21)$$

The output "vdq" of function generator 710 is divided by third filter capacitor voltage "Ecf3" by divider 709, and the results are sent to function generators 707 and 708. Function generator 707 sends 0 if its input is small, or sends 1 if the input is large. Conversely, function generator 708 sends 1 if its input is small, or sends 0 if the input is large.

Bandpass filter 711 receives second filter capacitor voltage "Ecf2" as its input, and sends only the function components that require noise suppression. The outputs of bandpass filter 711 and function generator 707 are multiplied by multiplier 705, and the results are sent to adder 706. Also, the outputs of coefficient multiplier 403 and function generator 708 are multiplied by multiplier 704, and the results are sent to adder 706. At adder 706, the outputs of multipliers 704 and 705 are multiplied and the results are sent as frequency correction value "dω1".

The outputs of adder 406 and function generator 708 are multiplied by multiplier 701, and the results are sent as q-axis voltage correction value "dvq". The outputs of coefficient multiplier 410 and function generator 708 are multiplied by multiplier 702, and the results are sent as d-axis voltage correction value "dvd". The outputs of first-order element 402 and function generator 708 are multiplied by multiplier 703, and the results are sent as q-axis current correction value "diq".

The fourth embodiment is valid when the AC voltage of power converter 4 is limited in magnitude. When the AC output voltage is low, since the output "vdq" of function generator 710 is small, function generator 707 sends 0 and function generator 708 sends 1. At this time, the output of adder 406, the output of coefficient multiplier 410, the output of first-order lag element 402, and the output of coefficient multiplier 403 become equal to q-axis voltage correction value "dvq", d-axis voltage correction value "dvd", q-axis current correction value "diq", and frequency correction value "dω1", respectively. Hence, operation is the same as the first noise-suppressing unit shown in FIG. 4, and effects similar to those of the first embodiment can be obtained.

When the AC output voltage is limited in magnitude, control based on d-axis voltage correction value "dvd" and q-axis voltage correction value "dvq" is not possible. In this case, since the output "vdq" of function generator 710 is large, function generator 707 sends 1 and function generator sends 0. At this time, d-axis voltage correction value "dvd", q-axis voltage correction value "dvq", and q-axis current correction value "diq" become equal to 0 and the control of these values is stopped. Of the entire second filter capacitor voltage "Ecf2", only the frequency components corresponding to the fault current to be suppressed are included in frequency correction value "dω1". The operation in this case is described below.

An increase in first filter capacitor voltage "Ecf1" also increases second filter capacitor voltage "Ecf2" and, hence, frequency correction value "dω1". An increase in frequency correction value "dω1" also increases the AC output frequency of power converter 4 and, hence, the slipping of induction machine 5. An increase in the slipping of induction machine 5 also increases torque and, hence, input power. Accordingly, the AC power of power converter 4 increases and this, in turn, also increases DC power and, hence, the DC current of power converter 4. As a result, increases in first filter capacitor voltage "Ecf1" are suppressed. Since decreases in first filter capacitor voltage "Ecf1" are also suppressed similarly, changes in first filter capacitor voltage "Ecf1" can be suppressed and consequently, the fault current can be suppressed. The operation in this case is analogous to that of the prior art. According to the frequency response curves shown in FIG. 3, however, the phase delay of the DC current with respect to the manipulated variable of the frequency is not significant in the regions that induction machine 5 rotates at high speed. The AC output voltage saturates in the regions that the rotational speed is high. Therefore, the phase delay of the DC current with respect to the manipulated variable of the frequency is insignificant, which means that this embodiment is also sufficiently effective.

A decrease in the voltage of current collector 1 due to an external cause also reduces first filter capacitor voltage "Ecf1", in which case, the magnitude limit value of the AC output of power converter 4 decreases. Conversely, a decrease in first filter capacitor voltage "Ecf1", namely, in third filter capacitor voltage "Ecf3", reduces the divisor of divider 709 and increases the output of divider 709. For these reasons, the magnitude of AC output decreases when the outputs of function generators 707 and 708 change. Accordingly, the magnitude of the AC output generated when the outputs of function generators 707 and 708 change also decreases with decreases in limit value. Consequently, operation will be normal, even if the voltage of current collector 1 fluctuates.

The outputs of function generators 707 and 708 need to change before the AC output voltage saturates. Data is therefore set so that the change between these outputs occurs with a value smaller than the output of divider 709 existing when AC output saturates. Also, the shock during the change can be minimized by making the gradient of output against input finite and gradually conducting the change.

The same also applies to the second and third embodiments. That is to say, even when the output voltage of power converter 4 saturates, stable operation can be realized by clearing the voltage correction value to 0 and changing the control of frequency to the method shown in FIG. 10.

Figure 11:
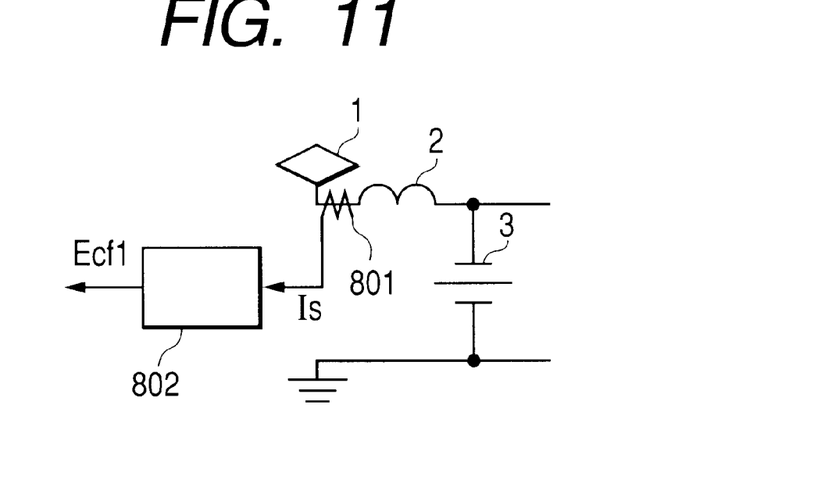
FIG. 11 is a block diagram of a power-receiving unit in a fifth embodiment.

A fifth embodiment of the present invention is shown in FIG. 11. Although the filter capacitor voltage of power-receiving unit 22 is detected in the first, second, and third embodiments described earlier in this document, the trolley wire current "Is" flowing through current collector 1 and filter reactor 2 is detected in the fifth embodiment as shown in FIG. 11. Numerals 801 and 802 in FIG. 11 denote a current detector which detects trolley wire current "Is", and an advance/lag element, respectively. Since filter reactor 2 has inductance "Lf" and resistance "Rf", the relationship shown in expression (22) below exists between trolley wire current "Is" and the voltage "Ecf" developed across filter capacitor 3.

Numeric expression 22

$$Ecf = (s \cdot Lf + Rf) \cdot Is \qquad (22)$$

Therefore, the same first filter capacitor voltage "Ecf1" as the filter capacitor voltage of power-receiving unit 22, can be generated by achieving the transfer function of expression (23) below by use of advance/lag element 802. However, T3 in expression (23) is a control time constant for avoiding complete differentiation, and this value is small enough with respect to the frequency of the fault current to be suppressed.

Numeric expression 23

$$\frac{s \cdot Lf + Rf}{s \cdot T3 + 1} \qquad (23)$$

Hence, even with the configuration shown in FIG. 11, an effect similar to that of power-receiving unit 22 can be obtained.

Figure 12:
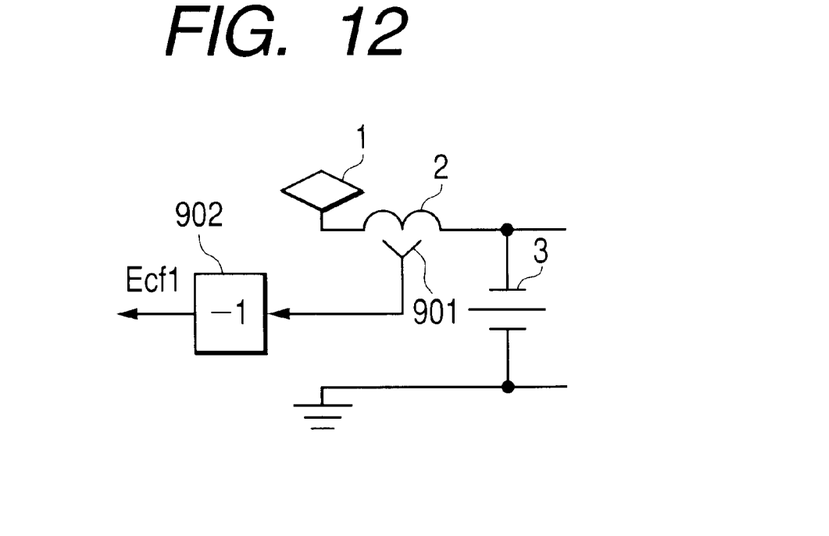
FIG. 12 is a block diagram of a power-receiving unit in a sixth embodiment.

A sixth embodiment of the present invention is shown in FIG. 12. In this embodiment, a circuit diagram of the power-receiving unit 22 used in the first, second, and third embodiments is shown as FIG. 12. Numeral 901 in FIG. 12 denotes a voltage detector that detects the voltage developed across the filter reactor, and numeral 902 denotes a reversing unit that reverses a sign.

When the voltage of current collector 1 is constant, the sum of the voltages across the filter reactor and across the filter capacitor is also constant. Focusing attention on AC components, therefore, enables one to see that the voltages at both ends of the filter capacitor are the same in magnitude and opposite in sign. For this reason, when the output of voltage detector 901 is reversed in sign by reversing unit 902, the AC components within the output of reversing unit 902 and the AC components of the first filter capacitor voltage "Ecf1" in power-receiving unit 22 will become equal. This means, therefore, that the use of the configuration shown in FIG. 12, instead of power-receiving unit 22, also offers a similar effect.

Figure 13:
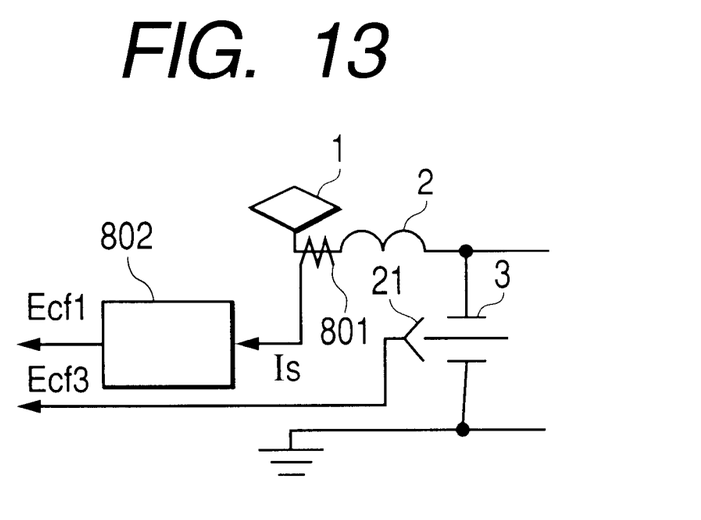
FIG. 13 is a block diagram of a power-receiving unit in a seventh embodiment.
Figure 14:
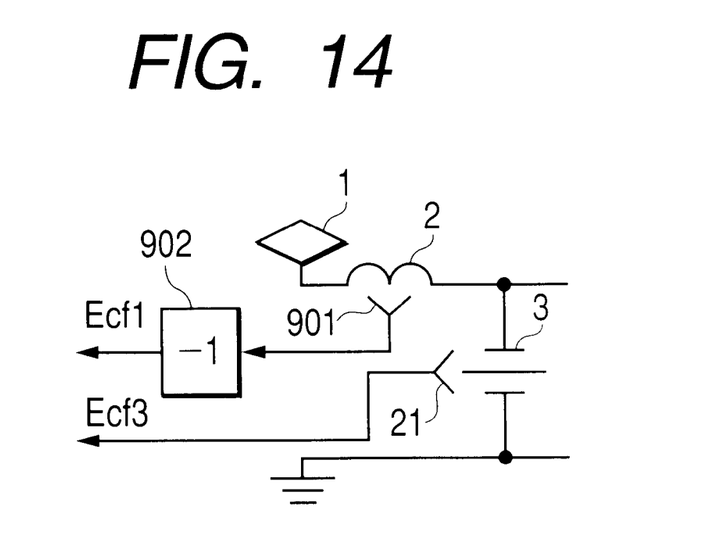
FIG. 14 is a block diagram of another power-receiving unit in the seventh embodiment.

Details of the sixth embodiment of the present invention are shown in FIGS. 13 and 14. In this embodiment, the power-receiving units shown in FIGS. 13 and 14 are used, instead of the power-receiving unit 23 in FIG. 8 showing the fourth embodiment. The circuits composed by adding to the circuit diagram of FIG. 11 a voltage detector 21 which detects the voltage developed across filter capacitor 3, are shown in FIG. 13. Voltage detector 21 is the same as used in power-receiving unit 23. Since expression (22) above includes complete differentiation, the DC components within the output of advance/lag element 802 do not match the DC components within the voltage developed across filter capacitor 3. However, the voltage across filter capacitor 3 that includes DC components is required for the third filter capacitor voltage "Ecf3", the input of the third noise-suppressing unit 601 shown in FIG. 9. Therefore, the output of voltage detector 21 needs to be used for the third filter capacitor voltage "Ecf3".

Since, as described earlier, the first filter capacitor voltage "Ecf1" is the same as the filter capacitor voltage of power-receiving unit 23, this configuration offers effects similar to those which can be obtained from the configuration shown in FIG. 9.

The circuits composed by adding to the circuit diagram of FIG. 12 a voltage detector 21 which detects the voltage developed across filter capacitor 3, are shown in FIG. 14. Voltage detector 21 is the same as used in power-receiving unit 23. The DC components within the output of reversing unit 902 do not match the DC components within the voltage developed across filter capacitor 3. Therefore, the output of voltage detector 21 needs to be used for the third filter capacitor voltage "Ecf3".

Since, as described earlier, the first filter capacitor voltage "Ecf1" is the same as the filter capacitor voltage of power-receiving unit 23, this configuration offers effects similar to those which can be obtained from the configuration shown in FIG. 9.

Effects of the Invention

According to the present invention, the fault current included in the trolley wire current can be effectively suppressed without increasing the capacities of the filter reactor or the filter capacitor.

What is claimed is:

1. A power converter control apparatus for sending an alternating-current voltage command, subject to a voltage command and a frequency command, to a power converter for converting a direct-current voltage into a variable alternating-current voltage of a variable frequency, said power converter control apparatus comprising:
   a detector for detecting an amount of electricity generated at the direct-current side of the power converter,
   a high-pass filter for removing direct-current components from the detected amount of electricity,
   a voltage corrector for correcting said voltage command in accordance with an output signal from said high-pass filter, and
   a frequency corrector for correcting said frequency command in accordance with said output signal from said high-pass filter,
   wherein an alternating-current voltage command is issued in accordance with output signals from said frequency corrector and said voltage corrector.

2. The power converter control apparatus according to claim 1, wherein said amount of electricity is the direct-current voltage of the power converter.

3. The power converter control apparatus according to claim 1, wherein power converter control apparatus is characterized in that the direct-current voltage of the power converter is supplied via a reactor connected in series with a direct-current power supply and via a capacitor connected in parallel with the power converter, and wherein said amount of electricity is a voltage developed across said reactor.

4. The power converter control apparatus according to claim 1, wherein the direct-current voltage of the power converter is supplied via a reactor connected in series with a direct-current power supply and via a capacitor connected in parallel with the power converter, and wherein said amount of electricity is a current flowing into said reactor.

5. A power converter control apparatus according to claim 1 wherein, when the output voltage of said power converter is saturated, said frequency command is corrected.

6. A power converter control apparatus having
   a voltage control unit for issuance of a first d-axis voltage command and a first q-axis voltage command, and
   a frequency control unit for output of a first frequency command,
   and capable of sending an alternating-current voltage command, subject to a voltage command and a frequency command, to a power converter for converting a direct-current voltage into a variable alternating-current voltage of a variable frequency,
   wherein said power converter control apparatus comprises:
   a detector for detecting an amount of electricity generated at the direct-current side of the power converter,
   a high-pass filter for removing direct-current components from the detected amount of electricity,
   a q-axis voltage corrector for correcting said q-axis voltage command in accordance with an output signal from said high-pass filter and sending a second q-axis voltage command, and
   a frequency corrector for correcting said frequency command in accordance with an output signal from said high-pass filter,
   wherein an alternating-current voltage command is issued in accordance with output signals from said frequency corrector and said second q-axis voltage command.

7. The power converter control apparatus according to claim 6, wherein said amount of electricity is the direct-current voltage of the power converter.

8. A power converter control apparatus according to claim 7, wherein said power converter control apparatus includes;
   a d-axis voltage corrector for correcting said first d-axis voltage command in accordance with an output signal from said high-pass filter and sending a second d-axis voltage command, and
   a frequency corrector for correcting said frequency command in accordance with an output signal from said high-pass filter,
   and wherein an alternating-current voltage command is issued in accordance with output signals from said frequency corrector and said second d-axis voltage command.

9. A power converter control apparatus according to claim 7, wherein said power converter control apparatus includes;
   an alternating-current detector for detecting the current generated at the alternating-current side of the power converter, a current-to-coordinate converter for detecting a first q-axis current command from said alternating-current detector, and a q-axis current corrector for correcting said first q-axis current command in accordance with an output signal from said high-pass filter and sending a second q-axis current command.

10. A power converter control apparatus according to claim 7, wherein said power converter control apparatus includes a speed estimation unit for estimating the rotational speed of an induction machine connected to the alternating-current side of the power converter and in that said frequency control unit issues said first frequency command in accordance with the above-estimated speed.

11. The power converter control apparatus according to claim 6, wherein the direct-current voltage of the power converter is supplied via a reactor connected in series with a direct-current power supply and via a capacitor connected in parallel with the power converter, and wherein said amount of electricity is a voltage developed across said reactor.

12. A power converter control apparatus according to claim 11, wherein said power converter control apparatus includes;

a d-axis voltage corrector for correcting said first d-axis voltage command in accordance with an output signal from said high-pass filter and sending a second d-axis voltage command, and a frequency corrector for correcting said frequency command in accordance with an output signal from said high-pass filter, and wherein an alternating-current voltage command is issued in accordance with output signals from said frequency corrector and said second d-axis voltage command.

13. A power converter control apparatus according to claim 11, wherein said power converter control apparatus includes;

an alternating-current detector for detecting the current generated at the alternating-current side of the power converter, a current-to-coordinate converter for detecting a first q-axis current command from said alternating-current detector, and a q-axis current corrector for correcting said first q-axis current command in accordance with an output signal from said high-pass filter and sending a second q-axis current command.

14. A power converter control apparatus according to claim 6, wherein the direct-current voltage of the power converter is supplied via a reactor connected in series with a direct-current power supply and via a capacitor connected in parallel with the power converter, and wherein said amount of electricity is a current flowing into said reactor.

15. A power converter control apparatus according to claim 14, wherein said power converter control apparatus includes;

a d-axis voltage corrector for correcting said first d-axis voltage command in accordance with an output signal from said high-pass filter and sending a second d-axis voltage command, and a frequency corrector for correcting said frequency command in accordance with an output signal from said high-pass filter, and wherein an alternating-current voltage command is issued in accordance with output signals from said frequency corrector and said second d-axis voltage command.

16. A power converter control apparatus according to claim 14, wherein said power converter control apparatus includes;

an alternating-current detector for detecting the current generated at the alternating-current side of the power converter, a current-to-coordinate converter for detecting a first q-axis current command from said alternating-current detector, and a q-axis current corrector for correcting said first q-axis current command in accordance with an output signal from said high-pass filter and sending a second q-axis current command.

17. A power converter control apparatus according to claim 6, wherein said power converter control apparatus includes;

a d-axis voltage corrector for correcting said first d-axis voltage command in accordance with an output signal from said high-pass filter and sending a second d-axis voltage command, and a frequency corrector for correcting said frequency command in accordance with an output signal from said high-pass filter, and wherein an alternating-current voltage command is issued in accordance with output signals from said frequency corrector and said second d-axis voltage command.

18. A power converter control apparatus according to claim 6, wherein said power converter control apparatus includes;

an alternating-current detector for detecting the current generated at the alternating-current side of the power converter, a current-to-coordinate converter for detecting a first q-axis current command from said alternating-current detector, and a q-axis current corrector for correcting said first q-axis current command in accordance with an output signal from said high-pass filter and sending a second q-axis current command.

19. A power converter control apparatus according to claim 6, wherein said power converter control apparatus includes a speed estimation unit for estimating the rotational speed of an induction machine connected to the alternating-current side of the power converter and in that said frequency control unit issues said first frequency command in accordance with the above-estimated speed.

20. A power converter control apparatus according to claim 6, wherein said power converter control apparatus includes a speed detector for detecting the rotational speed of an induction machine connected to the alternating-current side of the power converter and in that said frequency control unit issues said first frequency command in accordance with an output signal from said speed detector.

* * * * *